Patented Feb. 19, 1924.

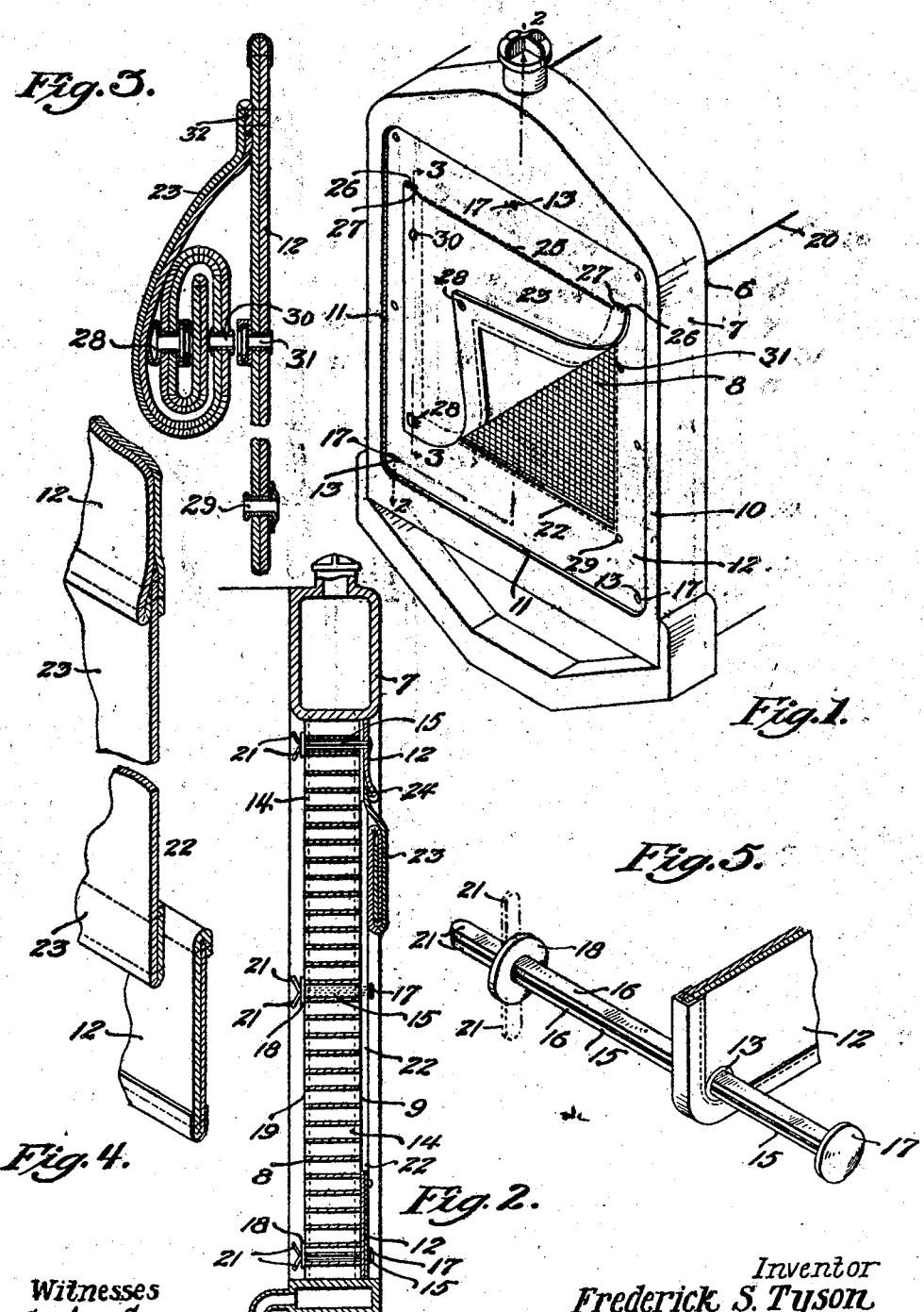

1,484,199

UNITED STATES PATENT OFFICE.

FREDERICK SAMUEL TYSON, OF LOCK HAVEN, PENNSYLVANIA, ASSIGNOR TO TYSON MFG. CO., OF LOCK HAVEN, PENNSYLVANIA.

AUTOMOBILE RADIATOR COVER.

Application filed February 4, 1922. Serial No. 534,051.

*To all whom it may concern:*

Be it known that I, FREDERICK S. TYSON, a citizen of the United States, residing at Lock Haven, in the county of Clinton and State of Pennsylvania, have invented certain new and useful Improvements in Automobile Radiator Covers, of which the following is a specification.

Numerous automobile radiator covers have been made; the ones in common use including parts for covering the entire radiator shell frame and honeycomb portion of the radiator. Usually the radiator shell is of a highly polished finish either nickel plated or highly finished to correspond with the finish of the hood or other portions of the automobile. It has been found that the polish and outer finish of the radiator shells are often ruined by covering them with the radiator covers of the above mentioned type for the reason that in stormy weather, water and sleet works its way in between the cover and the shell and owing to the radiator heat and other constant change of temperature, the finish and polish is marred and often ruined.

One object of my invention is to provide an improved radiator cover which can be applied and used so that it will not mar or ruin the finish of the radiator of an automobile on which the cover is carried.

Another object is to make my improved cover of a simple and durable construction which can be readily manufactured and easily and quickly applied to and removed from an automobile radiator.

A further object is to so construct my improved radiator cover that it will include a curtain which can be attached in a position to entirely cover the honeycomb portion of the radiator or can be moved and attached in a position to allow the exposure of a portion of the honeycomb part of the radiator.

These objects, and other advantageous ends which will be described hereinafter, I attain in the following manner, reference being had to the accompanying drawing in which—

Figure 1 is a fragmentary perspective view illustrating my improved cover in connection with an automobile radiator; one part of the curtain being shown bent outward to reveal a part of the honeycomb portion of the radiator, Figure 2 is a fragmentary sectional view taken on the line 2—2 of Figure 1 with the curtain partly rolled and attached in its rolled position to expose a part of the honeycomb portion of the radiator, Figure 3 is an enlarged fragmentary view of the cover with the curtain rolled as shown in Figure 2; a part of the length of the cover being broken away, Figure 4 is a fragmentary sectional perspective view illustrating the construction of certain of the parts of my improved cover, and Figure 5 is a perspective view illustrating one of the attaching devices in a position relatively to the cover.

Referring to the drawing, 6 represents an automobile radiator which includes a shell 7 in the form of a frame within the confines of which is mounted a radiating honeycomb portion 8 which may be of any of the usual constructions employed on various types of automobiles for the purpose of effecting cooling of the water for the purpose of keeping the motor at the proper operating temperature.

The front face 9 of the honeycomb portion 8 sets back slightly from the outer front surface 10 of the shell 7 and within this space provided by the inner surrounding surface 11 of the shell 7, I insert my improved cover frame 12. This cover frame 12 may be made of waterproof cloth or any other suitable material and includes eyelets 13 which are of such size and so positioned that they will be opposed to various channels or ducts 14 which are provided by the honeycomb portion of the radiator. Through these eyelets 13, I insert devices 15 of a structure shown in Figure 5; said devices including bars 16 which are joined together at their outer ends by a head 17. The opposite ends of the bars are adapted to be projected through the ducts 14 which register with the eyelets 13 and after the heads 17 are moved to press the cover frame 12 against the honeycomb portion of the radiator, the washers or rings 18 can be slipped on the inner ends of the bars 16 so as to abut the inner surface 19 of the honeycomb portion of the radiator; it being noted that the hood 20 can be opened to allow this action.

The bars 16 are longer than the ducts 14 and after the washers 18 are inserted, the end portions 21 of the bars 16 can be bent as shown in Figure 5 to prevent the devices from pulling out of the ducts 14 and also from moving relatively to the eyelets 13. The end portions 21 are spread to a distance greater than the width of the ducts so that it is impossible for the devices 15 to accidentally move outward and thus I can firmly secure in a quick and easy manner the cover frame 12 to and in front of the honeycomb portion of the radiator without any parts of the cover frame overlapping the front surface 10 of the shell 7. If desired the washers 18 can be made of non-metallic material so as to form an abutment with the thin metal of the honeycomb portion of radiator and thus guard against injury; it being noted that the non-metallic front portion or cover frame 12 is in engagement with the forward surface 9 of the honeycomb portion of the radiator.

The cover frame 12 is provided with an aperture 22 which can be covered by a curtain 23; this curtain having its top edge portion 24 sewed or otherwise suitably secured to the cover frame 12 above the top of the aperture 22. The top edge portion 24 of the curtain throughout a length which is slightly greater than the width of the aperture 22 is secured to the inner surface of the cover frame 12 above the edge 25 of the frame 12 which provides the top of the aperture 22. This edge 25 of the cover frame being slightly turned in as shown in Figure 2. The extreme end portions 26 of the top of the curtain can be allowed to overlap the front of the cover frame 12 by slightly cutting the curtain downward as shown at 27 so that the edge 25 will form a water shed to allow any water, snow or sleet which engages the frame 12 above the edge 25, to shed in front of the curtain so as not to enter between the cover and the radiator.

The curtain 23 is of greater length and width than the aperture 22 and I jointly provide the curtain and cover frame 12 with snap fastener parts 28 and 29 adjacent their bottoms so that the lower part of the curtain can be attached to completely close the aperture 22. The parts 29 of the snap fasteners are preferably made in the form of projections and the parts 28 are preferably made in the form of receptacles on their inner surfaces so that by merely lowering the curtain and pressing the parts 28 against the parts 29 they will snap into closing positions in the well known manner of snap fasteners.

I also preferably provide the curtain 23 and cover frame 12 with snap fastener parts 30 and 31 which are located at a position above the parts 28 and 29 so that when the curtain is rolled into the position shown in Figures 2 and 3 the parts 30 can engage the parts 31 and support the curtain in its rolled position so as to expose a part of the honeycomb portion 8 if such exposure is required to vary the temperature of the cooling medium for the motor. I preferably make the portions 30 in the form of projections which, when the curtain is in its lowered position, are on the outside thereof, so that when the cover is rolled, these projections can be made to engage the receptacle portions 31 on the cover frame 12. The curtain 23 is doubled over at its side edges and bottom and the tops at the parts 26 are turned inward as shown at 32 in Figure 3. Furthermore the frame 12 is made of a double thickness or fold of the fabric and I am thus enabled to secure a firm connection of the parts and to provide a durable structure.

To remove the cover it is but necessary to bend the end portions 21 of the devices 15 into their original positions after which the entire cover can be pulled forward so as to free the honeycomb portion of the radiator.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination of a radiator cover with a radiator having air ducts, said cover comprising an apertured frame fitting over said ducts and consisting of a plurality of layers, means for fastening said frame on said radiator, a curtain fastened with one edge in said frame at one edge of said aperture, and means on said frame and curtain for fastening said curtain in rolled position to expose a number of said air ducts, substantially as described.

2. The combination with a radiator including a frame and a portion therein provided with air ducts, of a flexible cover mounted over said portion and within the confines of said frame, means for fastening said cover in position, said cover comprising an apertured frame of a plurality of layers and a curtain stitched with one edge between the layers of said cover frame at one edge of said aperture, and means on said cover frame and curtain for fastening said curtain in rolled position to expose a desired number of said air ducts, substantially as described.

In testimony whereof I have signed my name to this specification in the presence of two subscribing witnesses.

FREDERICK SAMUEL TYSON.

Witnesses:
  E. MAY STEVENSON,
  T. M. STEVENSON.